United States Patent [19]

Degnan et al.

[11] 4,449,446
[45] May 22, 1984

[54] BALLISTICALLY TOLERANT CONTROL SYSTEM

[75] Inventors: William G. Degnan, Huntington, Conn.; John D. Fansler, Street, Md.

[73] Assignee: United Technologies Corporation, Hartford, Conn.

[21] Appl. No.: 297,482

[22] Filed: Aug. 28, 1981

Related U.S. Application Data

[63] Continuation-in-part of Ser. No. 73,833, Sep. 10, 1979, abandoned.

[51] Int. Cl.³ .......................... F01B 1/00; F16J 15/18; F16J 11/04
[52] U.S. Cl. ........................................ 92/146; 92/168; 92/170; 92/171; 89/36 A
[58] Field of Search ............. 92/146, 170, 151, 165 R, 92/171; 89/36 R, 36 A

[56] References Cited

U.S. PATENT DOCUMENTS

| 1,597,249 | 8/1926 | Riley | 92/170 |
| 2,392,449 | 1/1946 | Austin | 92/170 |
| 3,884,127 | 5/1975 | Simmons | 92/151 |
| 4,211,151 | 7/1980 | Wallischeck | 92/165 R |

FOREIGN PATENT DOCUMENTS

| 255184 | 6/1948 | Switzerland | 92/170 |

*Primary Examiner*—Paul E. Maslousky
*Attorney, Agent, or Firm*—Vernon F. Hauschild

[57] ABSTRACT

An improved jam-proof control including a cylinder-piston assembly in which the piston is controllably positioned within the cylinder to perform the control function and in which the cylinder snugly envelopes a deformable sleeve so that when the cylinder is deformed by sharp impact, the piston is permitted to continue to reciprocate within the cylinder due to the deformation, either due to frangibility or softness, of the sleeve.

2 Claims, 5 Drawing Figures

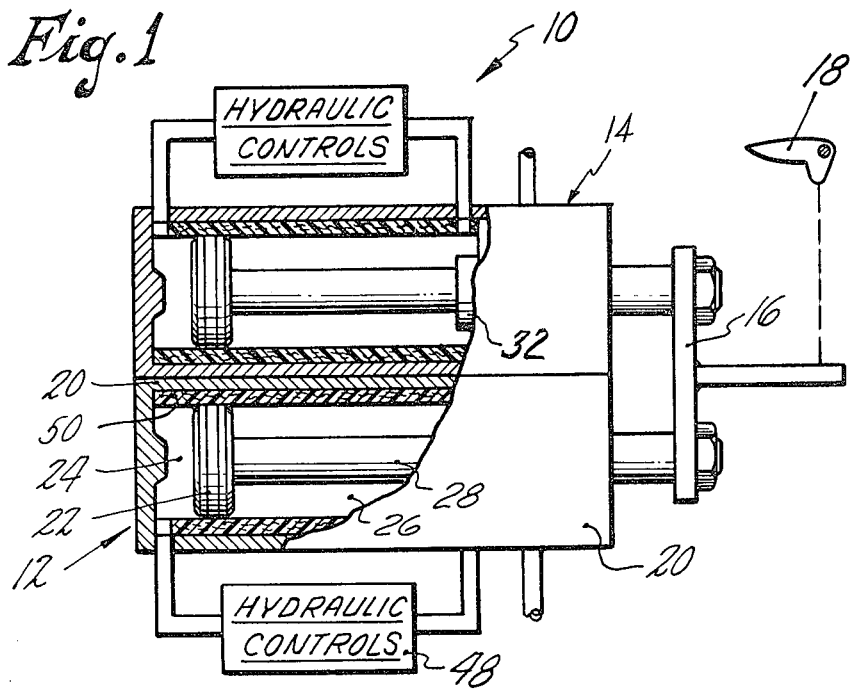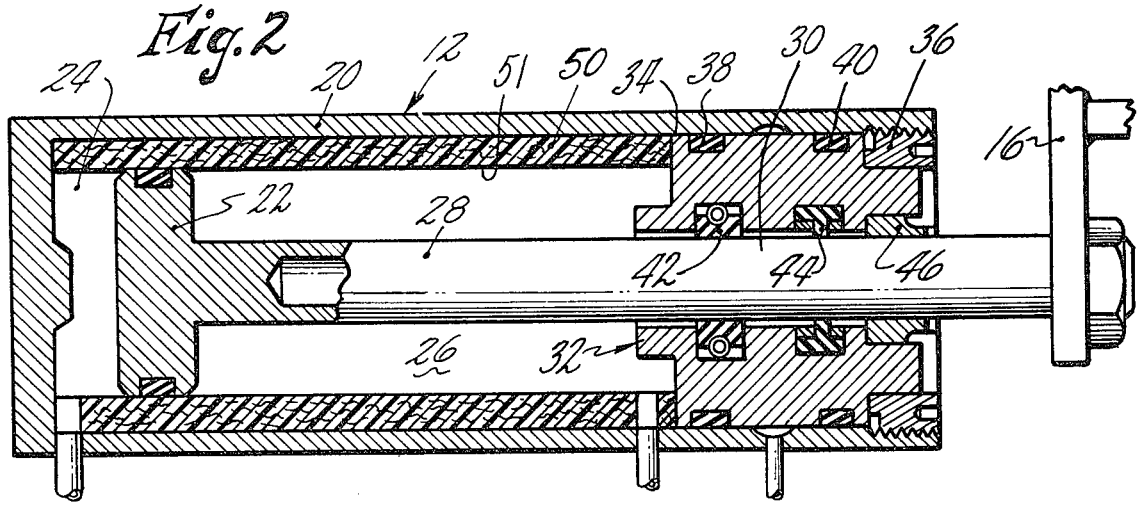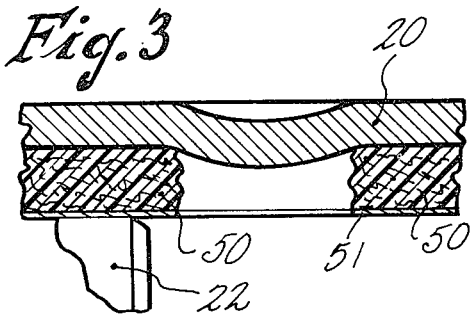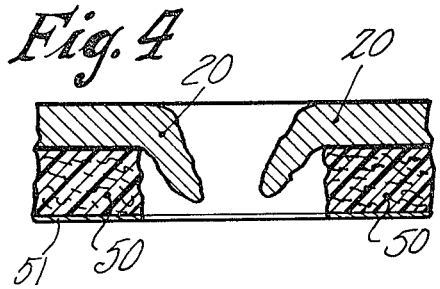

BALLISTICALLY TOLERANT CONTROL SYSTEM

CROSS REFERENCE TO RELATED APPLICATIONS

This is a continuation-in-part of Application Ser. No. 073,833, filed Sept. 10, 1979, now abandoned.

TECHNICAL FIELD

This invention relates to control mechanisms and particularly to those which perform the control function by selectively positioning a piston within a cylinder and with the piston rod extending through the cylinder wall so that its free end produces the control motion. Such controls are conventionally used on aircraft and other vehicles in which jamming of the piston within the cylinder produces control malfunction. One possible cause of piston jamming with a cylinder is the striking of the control by a projectile in flight wherein the ballistic damage caused by such a projectile in passing through the control cylinder may displace the cylinder material so as to impede piston motion or cause piston jamming.

BACKGROUND ART

In the flight control art, attempts have been made in the past to reduce or eliminate the ballistic vulnerability of a flight control by fabricating the cylinder and/or piston as armor utilizing conventional armorplate techniques. Such armor construction is shown in Sliney U.S. Pat. No. 3,566,741 which teaches tubular armorplate formed from an impact-resistant outer armor shell and a slightly softer inner armor shell. Such constructions proved to be unreasonably heavy and large, and therefore, unacceptable for aircraft use and, further, they proved not to provide the deisred ballistic-proof result.

Simmons U.S. Pat. No. 3,884,127 teaches such a control in which both the piston and the cylinder gland through which the piston rod extends are fabricated so as to be shearable so as to prevent piston or piston rod jamming. The Simmons patent has the disadvantage, however, that such flight controls are required to be tested to demonstrate that their structural integrity is such that they can withstand rupture or permanent deformation 2.5 times the normal operating pressure which causes the piston to reciprocate within the cylinder. This test requirement dictates that the area of the piston must be at least 2½ times the area of the cylinder gland to be able to demonstrate such structural integrity and still result in a cylinder gland which is shearable under normal operating conditions. This requirement that the piston area be at least 2½ times the gland area results in a control of larger envelope and a greater weight that would otherwise be necessary. This envelope and weight problem is added to by the fact that larger hydraulic chambers formed by such a piston require the use of more operating fluid, with the attendant requirement for a larger fluid supply and dispensing system. In addition, such a large piston generates larger-than-normal operating forces which must be reacted by the remainder of the control system so that the remainder of the control system must be correspondingly strengthened, further increasing the weight problem.

Wallischeck U.S. Application Ser. No. 960,521 filed Nov. 14, 1978, now U.S. Pat. No. 4,211,151, and entitled "Jam Proof Piston", and which is a continuation of U.S. Application Ser. No. 800,766 filed May 26, 1977, now abandoned teaches a concept of enveloping the piston rod of a hydraulic cylinder-piston mechanism in a control system with a sleeve of a material which is either frangible or deformable so that ballistic impact will cause disintegration or deformation thereof, and so that other deformed materials may move into the space left by the disintegrated sleeve or so that other moving parts may further displace the ballistically displaced material so as to permit the piston rod to continue (with respect to the cylinder) following ballistic damage.

DISCLOSURE OF THE INVENTION

A primary object of the present invention is to provide a control, including a cylinder/piston assembly, which is capable of withstanding the required structural integrity testing, which is of minimum weight and size, and which is capable of operation without piston jamming when the cylinder is deformed for any reason, particularly by a ballistic impact.

According to the present invention, the cylinder is fabricated so as to be able to withstand the required test loading at desired cylinder size and a deformable sleeve is snugly received in the cylinder bore and snugly, sealably envelope the piston so that the piston is able to reciprocate within the cylinder bore while maintaining sealing integrity across the piston.

In accordance with a further aspect of the present invention, the cylinder sleeve is fabricated to either be frangible so that it disintegrates upon ballistic impact or to be of a soft material which, once deformed by ballistic impact, will be further deformed by the passing piston so as to permit continued motion of the piston within the cylinder, thereby permitting continued control function.

It is an important feature of this invention that the wall thickness of the cylinder sleeve be sufficient that anticipated cylinder deformation due to ballistic hit will not extend radially inwardly therebeyond, and therefore the piston will be able to continue reciprocate through the deformed cylinder.

It is an important feature of this invention that the frangible sleeve is not a structural member and that the cylinder carries substantially all loading and provides support for the frangible sleeve.

It is still a further object of this invention to teach such a construction in which the cylinder sleeve is hydraulically loaded solely in compression and has the required flexibility to permit the required thermal expansion and the anticipated load deformation of the cylinder.

Other objects and advantages of the present invention may be seen by referring to the following description and claims, read in conjunction with the accompanying drawings.

BRIEF DESCRIPTION OF THE DRAWINGS

FIG. 1 is a cross-sectional showing of a control system of the flight variety utilizing our invention.

FIG. 2 is an enlarged and partial showing of such a control system to better illustrate the construction of the cylinder with its deformable sleeve and its associated piston.

FIG. 3 is a fragmentary showing of a cylinder following ballistic impact, without housing petalling.

FIG. 4 is a fragmentary showing of a cylinder following ballistic impact, with housing petalling.

BEST MODE FOR CARRYING OUT THE INVENTION

Figure 5:
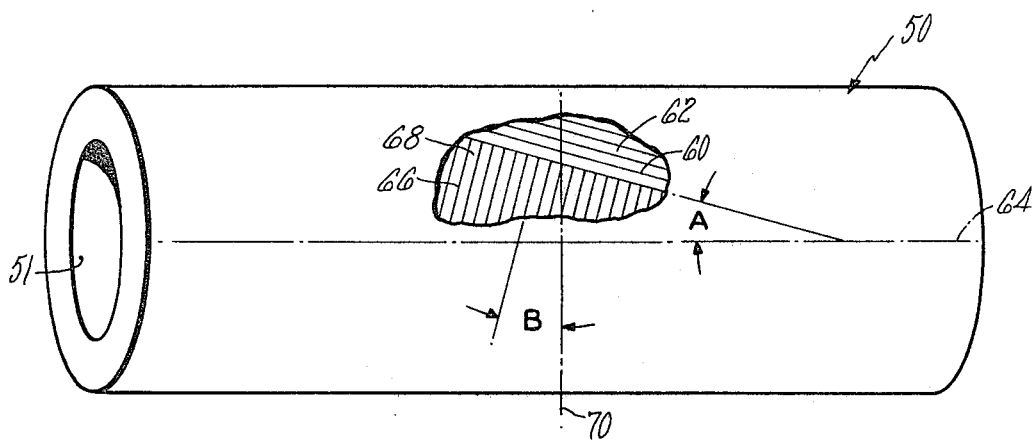
FIG. 5 is a schematic showing of our frangible, cylinder sleeve, partially broken away to demonstrate its anisotropic quality.

Referring to FIG. 1 we see a typical control 10 of the flight variety which includes two cylinder-piston assemblies 12 and 14 operating in parallel, so as to provide system redundancy, and which coact to position a control element 16, which is operably connected to and controls the position of the mechanism under control, such as flight surface 18. Cylinder-piston assemblies 12 and 14 are preferably identical in construction and operation so that cylinder-piston assembly 12 only will be described. Assembly 12 includes cylinder or cylindrical housing 20, which in conventional fashion, envelops piston 22 so as to cooperate therewith in forming pressure chambers 24 and 26 on opposite sides thereof.

In conventional fashion, piston rod 28, which may be solid or hollow, extends from piston 22 to a station external of cylinder 20 so that its free end 30 engages control member 16. Gland ring 32 constitutes the cylinder wall which envelops piston rod 28. As best shown in FIG. 2, gland ring 32 is structurally supported from cylinder 20 in that ring 32 abuts cylinder stop 34 and is held thereagainst by retainer ring 36, which threadably engages housing 20. O-rings 38 and 40 serve as a seal between the outer periphery of ring 32 and housing 20 and conventional dynamic rod seals 42 and 44 seal between the inner periphery of gland ring 32 and piston rod 28. Wiper ring 46 is connected to gland 32 and serves its conventional function. It will be evident to those skilled in the art that cylinder 20 could be of any conventional design, for example, a cylindrical member with end plates bolted to the opposite ends thereof and with appropriate sealing provisions between one of the end plates and piston rod 28.

Hydraulic controls 48, which are under pilot control, serve to control the pressure in chambers 24 and 26 and hence the reciprocating motion of piston 22 and piston rod 28 within cylinder 20.

It will be evident to those skilled in the art that while control 10 is shown to be hydraulically operated, it could as well be pneumatically operated, and that cylinder-piston assemblies 12 and 14 could as well operate in a conventional series relationship rather than the illustrated parallel relationship. A single cylinder arrangement could be used with appropriated pilot manual interconnect so that the pilot can manually provide the force required to actuate the piston following ballistic hit. While cylinder 20 is shown in FIGS. 1 and 2 cooperating with a reciprocating piston, the cylinder could in fact be cooperating with any member movable therewithin and cooperating therewith to establish appropriate pressure chambers for control actuation.

It will be evident by viewing FIG. 1 that as piston 22 is caused to reciprocate within cylinder 20, piston rod 28 reciprocates therewith so that its free end 30 causes control member 16 to position control surface 18 in accordance with the dictates of control 10.

Referring to FIG. 2, we see the construction of cylinder-piston assembly 12 in greater particularity. It will be noted that cylinder housing 20 snugly envelops sleeve member 50. Sleeve member 50 extends for substantially the full length of cylinder housing 20 and is preferably bonded thereto. Sleeve member 50 snugly envelops piston 22 and is in sealing engagement therewith so as to provide hydraulic pressure integrity thereacross so that hydraulic chambers 24 and 26 are maintained hydraulically independent. During normal operation, as piston 22 reciprocates within cylinder 20, sleeve 50 sealably engages piston 22. The function of sleeve 50 is to prevent jamming of piston 22 within cylinder housing 20 if the cylinder 20 is deformed for any reason such as ballistic impact.

Sleeve 50 is of selected wall thickness and fabricated of frangible, i.e. brittle, material so as to disintegrate or destruct by fragmentation upon ballistic impact so that, as best shown in FIGS. 3 and 4 with the cylinder housing 20 so deformed by ballistic impact and the adjacent portion of sleeve 50 disintegrated, the anticipated deformation of cylinder housing 20 is such that, in deformed orientation, cylinder housing 20 will not extend inwardly beyond the inner diameter of sleeve 50. In view of this construction, piston 22 can continue to reciprocate within deformed housing 20 and hence the control function of control 10 can continue, despite ballistic hit. If actuating pressure is lost due to the ballistic hit in cylinder-piston assembly 12, actuation of the control can continue with cylinder-piston 14 generating the operating force.

In an alternate form, sleeve 50 is made of a soft material so that it will deform with the cylinder housing 20 upon ballistic impact and it will deform further upon contact with piston 22 during attempted piston reciprocation to permit continued reciprocation of piston 22.

As used herein, deformable as relating to sleeve 50 means either frangible so that sleeve 50 fragments or disintegrates upon sharp contact, or soft so that sleeve 50 changes shape in response to sharp contact and further deforms to pass through the interior of gland 32 in response to actuating pressure. As shown in FIG. 3, deformation will take place when the ballistic impact causes housing 20 to become deformed without petalling, or, as shown in FIG. 4, when the ballistic impact causes petalling in housing 20.

In the frangible sleeve embodiment, sleeve 50 can be made of beryllium copper or carbon or boron. In the soft sleeve modification, sleeve 50 may be fabricated of a structural plastic, or of a composite material, such as adhesively bonded layers of fiberglass or a thermoplastic elastomer such as an olefinic or styrenic compound.

In our preferred embodiment, frangible sleeve 50 is a bonded, such as epoxy bonded, tape-wound graphite cylindrical shell, wound on a wear-resistant, very thin inner surface of electroformed nickel 51, cured and ground to proper dimension for installation and bonding into the cylinder housing 20. This tape is a series of parallel high tensile strength filaments bonded together as a flat tape. It will be evident to those skilled in the art that the frangible sleeve 50 could also be filament wound and bonded, such as epoxy bonded, then ground to proper dimensions, then bonded into the cylinder housing 20, and electroless nickel or nickel alloy surface 51 could be plated to the interior thereof for wear resistance to the moving piston 20. Any combination of electroformed nickel and electroless nickel could be used to form surface 51.

More particularly, concerning the construction of our preferred embodiment, sleeve 50 is laminated and made up of a plurality of superposed layers of wound, high tensile strength filaments and with the filaments of each layer bonded together and with the superposed filament layers bonded together. It is important that sleeve 50 be able to withstand required hydraulic servo loading, but also that sleeve 50 be anisotropic so that when subjected to ballistic impact and penetration, sleeve 50 will disintegrate locally only, rather than disintegrate totally as would be the case if the sleeve 50 were isotropic. To produce this anisotropic quality in sleeve 50, the high tensile strength filaments are wound so that the high tensile strength filaments of the different layers of the laminated construction form substantial angles with respect to one another. For example, as best shown in FIG. 5, parallel wound filaments 60 of layer 62 form acute angle A with sleeve longitudinal axis 64, while the parallel wound filaments 66 of layer 68 form acute angle B with cylinder lateral axis 70. By viewing FIG. 5 it will be noted that filaments 60 form a substantial angle with filaments 66, and are possibly substantially perpendicular thereto. The other layers or laminates of sleeve 50 are similarly filament wound with the parallel filaments extending in selected directions to best perform their hydraulic load carrying capability and to make sleeve 50 anisotropic.

In the FIG. 5 preferred construction, sleeve 50 is anisotropic because it does not have equal strength in all directions, as would be the case if sleeve 50 were made of ceramic-porcelain, glass, carbon, beryllium, copper, carbon, boron or any other homogeneous material. To understand the anisotropic quality of sleeve 50, it must be borne in mind that filaments or fibers such as 60 and 66, which are preferably made of graphite or boron, have a tensile strength of about 200,000 psi, while the plastic, such as resin epoxy, which bonds these filaments together, has the strength of about 10,000 psi. Accordingly, each layer of laminate of sleeve 50 will fracture upon ballistic impact and penetration in a direction perpendicular to the filaments due to the fact that the bonding plastic will fracture thereby permitting the filaments to part locally at the area of ballistic impact, but few filaments will actually fracture. Accordingly, since the strength of each layer of sleeve 50, and hence sleeve 50, is not equal in all directions, sleeve 50 is anisotropic. In view of this anisotropic quality, sleeve 50 will disintegrate locally, rather than totally, upon ballistic impact and penetration.

Sleeve 50 is hydraulically loaded in compression only and can accept compression loading since cylinder housing 20 is providing exterior structural support therefor.

In determining the inner diameter and the wall thickness of sleeve 50, the amount of cylinder housing 20 deformation anticipated such as petalling, can be determined by test. The amount of cylinder 20 deformation is determined by the type of material of which it is made and the speed and caliber of the projectile of concern.

As an added measure of insurance, our construction can be used in combination with the shearable piston construction of the Simmons U.S. Pat. No. 3,884,127, and the ballistically protected piston rod construction of the aforementioned Wallischeck Application Ser. No. 960,521.

We wish it to be understood that we do not desire to be limited to the exact details of construction shown and described, for obvious modifications will occur to a person skilled in the art.

We claim:

1. A control including:
   (1) a cylinder-piston assembly comprising:
      a. a cylinder having a bore portion,
      b. a piston positioned in said cylinder bore for reciprocation therewithin and defining a pressure chamber on at least one side thereof within said bore,
      c. a piston rod extending from said piston longitudinally along said bore and terminating at a station external thereof,
      d. a fixed wall member supported from said cylinder and having an aperture enveloping said piston rod and constituting the structural end wall of said pressure chamber,
      e. a laminated, frangible, anisotropic cylindrical sleeve fabricated of a plurality of superposed layers of wound and plastic bonded high tensile strength filament, and with the filaments of each layer being substantially parallel to each other and extending in a direction substantially different from the filament of at least one of the other layers so that each layer and hence said sleeve is anisotropic, and wherein said sleeve is bonded to said cylinder bore and extends substantially the full length thereof and envelops said piston, and wherein said sleeve has a thin, brittle, wear-resistant inner nickel plated surface on the inner diameter of the sleeve to present a wear-resistant contact surface in sealing engagement with said piston and being of selected wall thickness and frangibility so that when said cylinder is subjected to sharp impact, the cylinder will deform and the sleeve with said inner surface will disintegrate locally in the vicinity of the sharp impact and cylinder deformation, and the piston will be able to reciprocate within the cylinder with the sleeve so disintegrated,
   (2) means to control the flow of pressurized fluid to said pressure chamber to cause said piston to move within said cylinder during normal operation, and
   (3) a fluid actuator means operatively connected to said cylinder-piston assembly to cause said piston to reciprocate within said cylinder when cylinder is so deformed and said sleeve so disintegrated due to sharp impact.

2. A control according to claim 1 wherein said sleeve wound filament is graphite and the bonding material is epoxy.

* * * * *